April 5, 1960 D. H. KEISER, JR 2,931,158
LAWN EDGE TRIMMING SHEARS AND THE LIKE
Filed Dec. 10, 1956 2 Sheets-Sheet 1
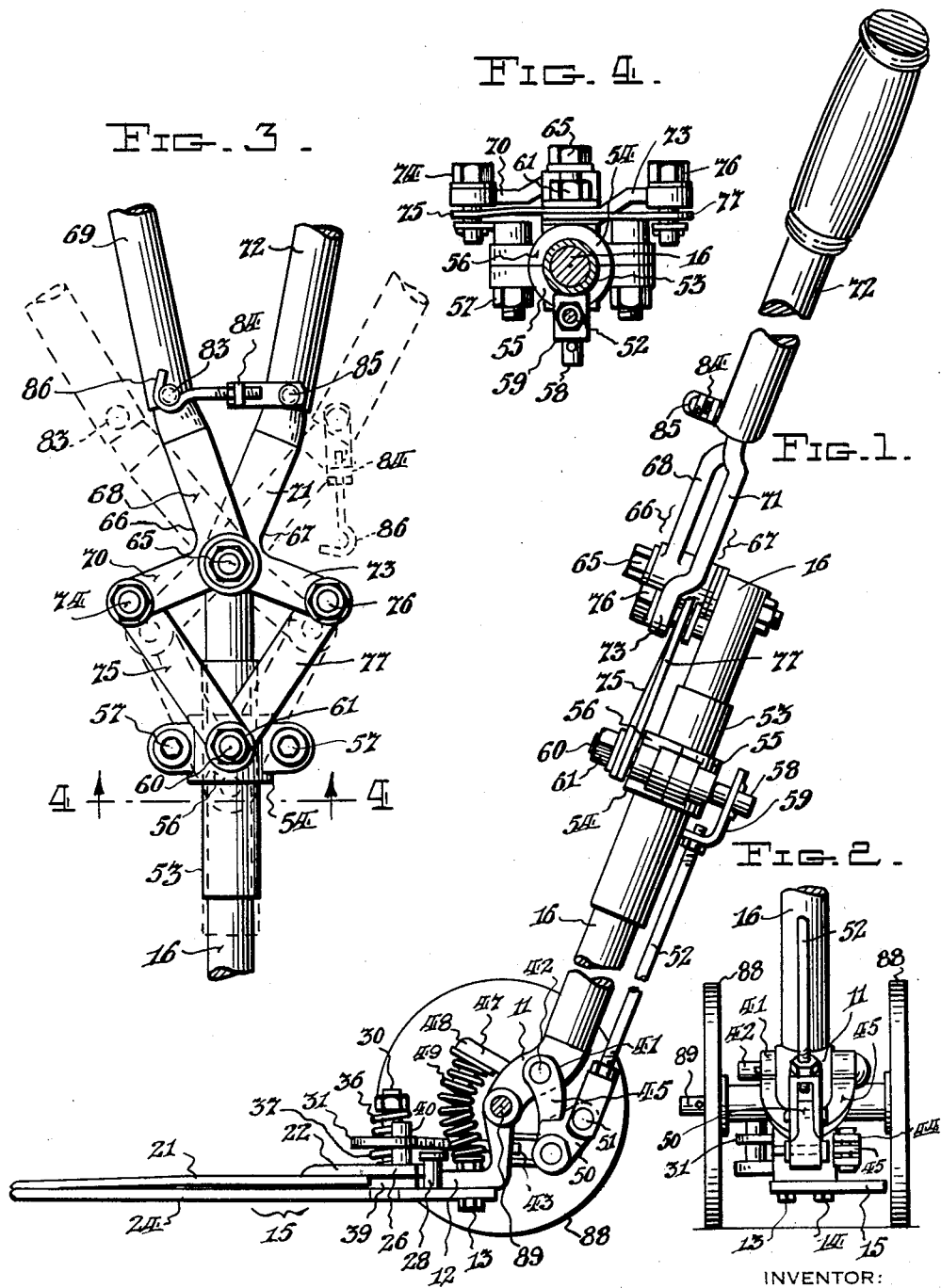
INVENTOR:
David H. Keiser, Jr.,
BY
Alfred E. Tschinger
ATTORNEY

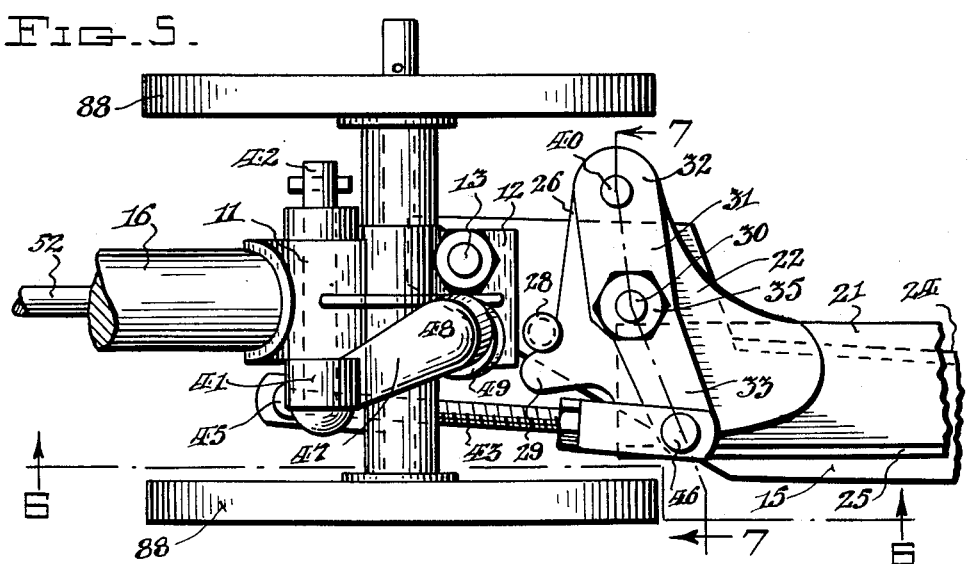

United States Patent Office 2,931,158
Patented Apr. 5, 1960

2,931,158

LAWN EDGE TRIMMING SHEARS AND THE LIKE

David H. Keiser, Jr., West Lawn, Pa.

Application December 10, 1956, Serial No. 627,493

6 Claims. (Cl. 56—241)

This invention relates, in general, to shearing devices which comprise a pair of cutting blades that are cooperatively actuated relative to each other to effect cutting operation of the device; and more particularly to shearing devices of the type adapted to be employed for trimming the edges of lawns and other places in which the grass is not cut smoothly by the lawn mower which is customarily employed.

For the purposes of exemplification, or illustration, the present invention is herein disclosed in the form of a practical lawn edge trimming shear device. From this disclosure, it will be readily apparent to those skilled in this art how the present invention can be embodied, or applied, in the same or in similar manner, to other types of shearing devices.

One object of the present invention is to provide a novel shearing device of the type indicated.

Another object of the invention is to provide a device which has certain structural and functional features of advantage over similar devices of the prior art.

A further object of the invention is to provide such a device having novel means for effecting positive canting and axial movement of one of the blades thereof relative to the other, during the cutting operation of the device, which means includes a new canting angle establishing element.

A further object of the invention is to provide a new and improved shearing device with a pair of cutting blades, one fixed blade and a second blade pivoted thereon, including novel means for utilizing both hands when a person is in an upright walking position to actuate the pivoted blade.

A still further object of the invention is to provide a new and improved shear operating mechanism in which the hand movement is generally the most natural movement of a person in moving his two hands toward and away from each other.

An additional object of the invention is to provide a new and improved operating mechanism for a shearing device of the type having one fixed blade and a second blade pivoted thereon, in which the second blade is connected to a pair of handle bars by means including a double bell crank unit forming part of said handle bars and having a common pivotal connection with a fixed part of the device.

It is also an object of the invention to support the fixed blade at a given height relative to the surface of the lawn being trimmed and in line with its surface, yet to permit said blade to be tilted up or down as required.

With these and other objects in view, which will become more readily apparent from the following detailed description of the various unique, practical and illustrative shear improvements shown in the accompanying drawings, the present invention comprises the novel shears, cutting blade units, elements, features of construction and arrangement of parts in cooperative relationship, as more particularly indicated and defined by the hereto appended claims.

In the accompanying drawings:

Figure 1 is a side elevation of a shearing device embodying the present invention, the wheel on the near side being removed;

Fig. 2 is a rear elevation of the lower portion of the structure shown in Fig. 1;

Fig. 3 is a front elevation of the intermediate portion of the structure shown in Fig. 1;

Fig. 4 is a transverse section taken along the line 4—4 of Fig. 3;

Fig. 5 is an enlarged plan view of a portion of the lower end of the shearing device;

Fig. 6 is a vertical section taken along the line 6—6 of Fig. 5;

Fig. 7 is a vertical transverse section taken along the line 7—7 of Fig. 5; and

Fig. 8 is a bottom plan view of a portion of the movable blade removed from the device.

Referring to the drawings, the new and improved shearing device may comprise a head 11 having its lower portion formed with a laterally extending flange 12, to the underside of which flange is fixedly secured, as by bolts 13 and 14, one end of a cutting blade 15.

Rigidly connected to the upper portion of the head 11, is a rod or shaft 16, which may extend for a considerable distance from the head and be obliquely arranged in suitable angular relationship with respect to the blade 15, as shown in Figs. 1 and 6, so that when the blade 15 is disposed in a substantially horizontal position, the shaft 16 will extend upwardly and rearwardly with respect thereto.

The construction and arrangement of the parts is such that the shaft 16, the head 11, and the shear blade 15 constitute a rigid structure, said shaft being part of the handle structure, the blade 15 being the fixed blade, and the head 11 being adapted to support certain parts of the operating mechanism of the shearing device, as will be hereinafter more fully described.

Above the lower fixed shear blade 15, there is arranged a movable shear blade 21, having a lateral operating extension 22 rigidly connected thereto by any suitable means, such as by rivets 23, shown in Fig. 8.

It will be understood that the blades 15 and 21 have oppositely bevelled sides forming conventional cooperating cutting edges 24 and 25, respectively, as shown, the upper movable blade 21 desirably having, as shown in Fig. 1, a usual curvature insuring better cutting action as heretofore and well known.

The portion 22 of the movable blade 21 extends a suitable distance beyond the end of the blade proper, said portion 22 also extending laterally a suitable distance from the side edge of the blade opposite to the cutting edge 25. In this way the portion 22 is offset with respect to the main body of the blade 21, so as to provide an elongated nose 26, as shown best in Fig. 8.

An opening 27 is formed in the portion 22 of the movable blade 21, said opening being preferably arranged intermediately of the portion 22 in suitable spaced relation with respect to the tip of the nose 26.

Upstanding from the fixed blade 15, is a stud 30, which passes through the opening 27 to provide a pivot for the movable blade 21.

As shown in Fig. 7, the opening 27 may be greater in diameter than the diameter of the stud 30, so that the movable blade 21 will be loosely mounted on said stud for a purpose to be hereinafter more fully described.

Also pivotally mounted on the stud 30 and arranged in suitable spaced relation above the movable blade 21, is a lever 31 having a pair of oppositely projecting arms 32 and 33.

The upper portion of the stud 30 is formed with screw threads on which is mounted a nut 35 which is normally arranged in spaced relation above the lever 31.

Encircling the stud 30 and bearing at one end against the upper surface of the lateral extension 22 of the movable blade 21 and bearing at the other end against the bottom surface of the lever 31, is a coil spring 36.

Also encircling the stud 30 and bearing at one end against the upper surface of the lever 31 and bearing at the other end against the bottom of the nut 35, is a second coil spring 37.

The construction and arrangement of the parts is such that the lever 31 is resiliently supported between the two coil springs 36 and 37 in suitable spaced relation above the movable blade 21, and at the same time said springs act against the movable blade to force said blade toward the fixed blade 15. The tension of the coil springs 36 and 37 may be adjusted by turning the nut 35 upwardly or downwardly on the threaded portion of the stud 30 to the desired position.

In shearing devices of the type of the present invention it is desirable to provide for canting the movable blade 21 with respect to the fixed blade 15 during the cutting operation. Therefore, in order to enable the canting of the movable blade 21, the underside of the lateral extension 22 is formed with a downwardly extending rib 39 adapted to rest on the upper surface of the fixed blade 15 so as to normally space the movable blade above the fixed blade. The rib 39 is arranged offset with respect to the main body of the blade 21, being preferably disposed at a suitable point between the opening 27 and the tip of the nose 26, so that when the device is not in operation the blade 21 will be disposed by the pressure exerted thereagainst by the springs 36 and 37, in substantially parallel relationship with respect to the fixed blade 15 and spaced slightly thereabove, as is clearly shown in Fig. 7. In this connection it will be noted that the construction and arrangement of the parts is such that the rib 39 is located at one side of the pivot provided by the stud 30, and the bevelled cutting edge 25 of the blade 21 is at the opposite side of the stud 30. In this way the blade 21 can be canted in the manner shown by broken lines in Fig. 7.

A pin 28 mounted on the fixed blade 15 and engageable by a lug 29 projecting outwardly from the portion 22, is adapted to limit the closing movement of the movable blade 21 with respect to the fixed blade 15, as shown best in Fig. 5.

The arm 32 of the lever 31 is connected to the nose 26 of the lateral extension 22 of the movable blade 21 by a pin 40 upstanding from said nose and rigidly mounted in said lateral extension. This construction is such that when the lever 31 is rocked about its pivot provided by the stud 30, the movable blade 21 will be operated.

A bell crank 41 in the form of a yoke is rockingly mounted upon a pin 42 carried by the head 11 and an adjustable link 43 is pivotally connected as at 44 to one arm 45 of said bell crank and to the arm 33 of the lever 31 as at 46.

Another arm 47 of the bell crank 41 extends outwardly and terminates in a head 48 that overlies the bolt 14 heretofore referred to.

Interposed between the head 48 and the flange 12 is a spring 49, which functions in a manner substantially similar to the springs 5 shown and described in my prior Patents Number 2,281,977, dated May 5, 1942, and Number 2,407,237, dated September 10, 1946, to urge the movable blade away from the fixed blade 15.

Extending rearwardly from the arm 45 of the bell crank 41 is an ear 50 to which is pivotally connected as at 51 the lower end of a rod or link 52.

A sleeve 53 is slidably mounted on the upper portion of the rod or shaft 16 heretofore referred to.

Mounted on the sleeve 53 is a split collar 54 having its two sections 55 and 56 detachably secured together by bolts 57 arranged to clamp the collar fixedly onto the sleeve 53 in known manner.

Projecting from the section 55 of the collar 54 is a stud or pin 58, to which is pivotally connected, as at 59, the upper end of the rod or link 52.

Projecting from the section 56 of the collar 54 is a stud or pin 60 which is provided with screw threads for receiving a nut 61.

As seen in Fig. 1, the sleeve 53 is mounted on the rod or shaft 16 in suitable spaced relation from the upper extremity of said rod or shaft.

Pivotally connected, as at 65, to the upper portion of the rod or shaft 16, is a double bell crank unit comprising a pair of bell cranks 66 and 67, arranged in the manner shown best in Fig. 3.

The bell crank 66 has one leg 68 to which is integrally connected a handle bar 69, and a second leg 70 which projects laterally from the pivot 65 and is arranged substantially at right angles with respect to the leg 68.

The bell crank 67 has one leg 71 to which is integrally connected a handle bar 72, and a second leg 73 which projects laterally from the pivot and is arranged substantially at right angles with respect to the leg 71.

The construction and arrangement of the parts is such that the two bell cranks 66 and 67 have a common pivot, with their several legs in the form of an X, with the legs 68 and 70 of the bell crank 66 at one side of the center of the pivot 65, and the legs 71 and 73 of the bell crank 67 at the opposite side of the center of the pivot 65.

Pivotally connected as at 74 to the extremity of the leg 70 of the bell crank 66 is one end of a link 75 having its other end pivotally connected to the stud or pin 60, and pivotally connected as at 76 to the extremity of the leg 73 is one end of a link 77 having its other end also pivotally connected to the stud or pin 60. The construction and arrangement of the parts is such that the double bell cranks 66 and 67 and the links 75 and 77 constitute a toggle joint for operatively connecting the handle bars 69 and 72 with the sleeve 53 so that when the handle bars are operated in directions toward and away from each other, rectilinear movements will be imparted to the sleeve 53. Since the sleeve is connected to the arm 45 of the bell crank 41 by the rod or link 52, the bell crank 41 will be rocked on its pivot 42. The bell crank 41, operating through the link 43, will act to swing the lever 31 on its pivot 30 and thus cause said lever to actuate the movable blade 21 through the pin 40. Due to the construction of the movable blade 21 with the downwardly extending rib 39, said movable blade will be in such canting position above the fixed blade 15 during the cutting action that the cutting edges of the blades are maintained in positive cutting engagement up to the full cutting capacity of the shears.

It has heretofore been described that the purpose of the spring 49 is to urge the movable blade 21 away from the fixed blade 15. The construction and arrangement of the parts is such that when the movable blade 21 is thus disposed in a wide angle open position with respect to the fixed blade 15, through the action of the spring 49, the bell crank arm 47 is forced upwards in the direction indicated by the arrow 81, Fig. 6. This upward movement of the arm 47 turns the bell crank 41 in a counter clockwise direction on its pivot 42, with the result that the angular relationship of the handle bars 69 and 72 is increased considerably, as shown by the broken lines in Fig. 3, through the combined action of the means heretofore described which are provided for operatively connecting said handle bars with the bell crank 41.

When the shearing device is not in use, it is desirable to keep the blades 15 and 21 fixed in a substantially closed position, such as the position shown in Fig. 5. For this purpose, according to the present invention, a suitable blade closing locking device is provided, said locking device comprising a pin 83 fixed to the handle bar 69 and a latch bar 84 having one end pivotally connected to the handle bar 72 by a pin 85 and having its free end formed with a hook 86 arranged to engage the pin 83 when the handle bars 69 and 72 are in the position to maintain the blades 15 and 21 in closed position. It will be understood that the latch bar 84 is freely swingable about its pivot provided by the pin 85. It will be noted by referring to Fig. 3 that the hook 86 is formed so that the latch bar 84 is adapted to be moved in an upward direction in order to hook the latch bar onto the pin 83. With this construction the latch bar 84 can, under certain conditions, become detached from the pin 83 by gravity. However, due to the action of the spring 49 to normally urge the separation of the handle bars 69 and 72, when the latch bar 84 is hooked onto the pin 83, the tension of the spring 49 is increased sufficiently to maintain the hook 86 in locking engagement with the pin 83. The handle bars 69 and 72 will thus be locked together in shear blade closing position until said handle bars are manually operated to cause the latch bar 84 to be uncoupled from the pin 83 and fall by gravity to the unlatching position shown by broken lines in Fig. 3.

In order to support the fixed blade 15 at a given height relative to the surface of the lawn being trimmed by the device, wheels 88 are journalled at 89 upon the head 11. These wheels permit the device to be easily pushed by a person walking over the lawn so that the fixed blade 15 can be maintained in line with the surface of the lawn. However, since the handle bars may be swung forwardly and backwardly by the operator about the pivot 89, the fixed blade 15 can be tilted up and down as required to trim uneven or irregular places in the lawn in the desired manner.

From the foregoing description of the construction shown in the drawings, it is believed the nature of the new and improved shearing mechanism may be readily apparent, as well as the advantages resulting therefrom of an assured cutting efficiency free of binding or clogging, and with a minimum of friction and wear, and less tiresome to operate. The particular construction shown and described may of course be used with other types of shears than the lawn edger herein described.

It will also be understood that the shearing device improvements specifically shown and described, can be changed and modified in various ways without departing from the invention herein disclosed, and more particularly defined by the hereto appended claims.

I claim:

1. In combination with shears having a pair of cutting blades arranged for cooperative cutting action in a substantially horizontal plane; of a head on which the shears are operatively mounted; a ground contacting wheel support; means pivotally connecting said head and wheel support so that the shears are vertically adjustably positionable in different angular cutting relation to the ground in said substantially horizontal plane; an elongated rod having its lower end fixedly secured to said head and arranged to extend upwardly from the latter in rearwardly inclined relation therewith; a slide member mounted on the upper portion of said rod for guided movement therealong; a pivot element fixedly secured to the upper end of said rod; a pair of bell crank levers mounted on said pivot element in opposed order; two operating handles each of which is fixedly secured to one leg of one of said bell crank levers in such manner that the handles are movable toward and from each other about said pivot element; a pivot element fixedly secured on said slide member; a pair of connecting links each of which is arranged to extend from one leg of one of said bell crank levers to the pivot element on said slide member; and motion transmitting means arranged between said slide member and shears in such manner that movement of the slide member in one direction will effect cutting action of the shears.

2. The combination in accordance with claim 1, including a compression spring that is mounted on said head and arranged to exert pressure on the motion transmitting means in such manner as to urge cutting blade separation of the shears.

3. The combination in accordance with claim 1, which includes a self-releasing locking device arranged in connecting relation between said operating handles.

4. In combination with shears having a pair of cutting blades arranged for cooperative cutting action in a substantially horizontal plane; of a head on which the shears are operatively mounted; a ground contacting wheel support; means pivotally connecting said head and wheel support so that the shears are vertically adjustably positionable in different angular cutting relation to the ground in said substantially horizontal plane; an elongated rod having its lower end fixedly secured to said head and arranged to extend upwardly from the latter in rearwardly inclined relation therewith; a sleeve member mounted on the upper portion of said rod for guided sliding movement therealong; a pivot element fixedly secured to the upper end of said rod; a pair of bell crank levers mounted on said pivot element in opposed order; two operating handles each of which is fixedly secured to one leg of one of said bell crank levers in such manner that the handles are movable toward and from each other about said pivot element; a pivot element fixedly secured on said sleeve member; a pair of connecting links each of which is arranged to extend from one leg of one of said bell crank levers to the pivot element on said sleeve members; and motion transmitting means arranged between said sleeve member and shears in such manner that movement of the sleeve member in one direction will effect cutting action of the shears.

5. In combination with shears having a pair of cutting blades arranged for cooperative cutting action in a substantially horizontal plane; of a head on which the shears are operatively mounted; a ground contacting wheel support; means pivotally connecting said head and wheel support so that the shears are vertically adjustably positionable in different angular cutting relation to the ground in said substantially horizontal plane; an elongated rod having its lower end fixedly secured to said head and arranged to extend upwardly from the latter in rearwardly inclined relation therewith; a sleeve member mounted on the upper portion of said rod for guided sliding movement therealong; a pivot element fixedly secured to the upper end of said rod; a pair of bell crank levers mounted on said pivot element in opposed order; two operating handles each of which is fixedly secured to one leg of one of said bell crank levers in such manner that the handles are movable toward and from each other about said pivot element; a pivot element fixedly secured on said sleeve member; a pair of connecting links each of which is arranged to extend from one leg of one of said bell crank levers to the pivot element on said sleeve member; motion transmitting means arranged between said sleeve member and shears in such manner that movement of the sleeve member in one direction will effect cutting action of the shears; and a compression spring that is mounted on said head and exerts pressure on the motion transmitting means in such manner as to urge cutting blade separation of the shears.

6. In combination with shears having a pair of cutting blades arranged for cooperative cutting action in a substantially horizontal plane; of a head on which the shears are operatively mounted; a ground contacting wheel support; means pivotally connecting said head and wheel support so that the shears are vertically adjustably positionable in different angular cutting relation to the ground in said substantially horizontal plane; an elongated rod having its lower end fixedly secured to said head and arranged to extend upwardly from the latter in rearwardly inclined relation therewith; a sleeve member mounted on the upper portion of said rod for guided sliding movement therealong; a pivot element fixedly secured to the upper end of said rod; a pair of bell crank levers mounted on said pivot element in opposed order; two operating handles each of which is fixedly secured to one leg of one of said bell crank levers in such manner that the handles are movable toward and from each other about said pivot element; a pivot element fixedly secured on said sleeve member; a pair of connecting links each of which is arranged to extend from one leg of one of said bell crank levers to the pivot element on said sleeve member; motion transmitting means arranged between said sleeve member and shears in such manner that movement of the sleeve member in one direction will effect cutting action of the shears; a compression spring that is mounted on said head and exerts pressure on the motion transmitting means in such manner as to urge cutting blade separation of the shears; and a self-releasing locking device arranged in connecting relation between said operating handles.

References Cited in the file of this patent

UNITED STATES PATENTS

| | | |
|---|---|---|
| 208,467 | Conover | Oct. 1, 1878 |
| 222,672 | Conover | Dec. 16, 1879 |
| 1,600,391 | Barrett | Sept. 21, 1926 |
| 1,727,067 | Keefe | Sept. 3, 1929 |
| 2,564,148 | Broderick | Aug. 14, 1951 |
| 2,569,888 | Gustafson | Oct. 2, 1951 |
| 2,607,114 | Keiser | Aug. 19, 1952 |
| 2,661,534 | Keiser | Dec. 8, 1953 |
| 2,672,684 | Kalish | Mar. 23, 1954 |
| 2,749,615 | Griffon | June 12, 1956 |